United States Patent [19]

Bighouse

[11] Patent Number: 4,932,225
[45] Date of Patent: Jun. 12, 1990

[54] BEVERAGE CONTAINER COOLER

[76] Inventor: Mary E. Bighouse, 3451 Bufford Ct., Columbus, Ohio 43231

[21] Appl. No.: 390,037

[22] Filed: Aug. 7, 1989

[51] Int. Cl.⁵ .............................................. F25D 3/08
[52] U.S. Cl. ...................................... 62/457.4; 62/372
[58] Field of Search ..................... 62/457.4, 372, 457.1

[56] References Cited

U.S. PATENT DOCUMENTS

| | | | |
|---|---|---|---|
| 3,807,194 | 4/1974 | Bond | 62/457.4 |
| 3,998,072 | 12/1976 | Shaw | 62/457.4 |
| 4,163,374 | 8/1979 | Moore et al. | 62/457.4 |
| 4,197,890 | 4/1980 | Simko | 62/372 X |
| 4,741,176 | 5/1988 | Johnson et al. | 62/457.4 |
| 4,745,776 | 5/1988 | Clark | 62/457.4 |

FOREIGN PATENT DOCUMENTS 511685  8/1939  United Kingdom ............... 62/457.4

*Primary Examiner*—Lloyd L. King
*Attorney, Agent, or Firm*—Biebel, French & Nauman

[57] ABSTRACT

A beverage container cooler is provided having a roughly cylindrical container having an open end, an insert capable of encircling a beverage container, the insert being filled with a cooling fluid that, when cooled assists in maintaining the temperature inside the roughly cylindrical container when the insert is placed thereinto, and a lid which is securable to the roughly cylindrical container. The lid has secured thereto a handle. The insert preferably comprises a plurality of pouches which contain the cooling fluid, with the cooling fluid preferably being a gelatinous substance capable of being refreezable. The roughly cylindrical container comprises a bottom and sidewall. The sidewall comprising a lower portion and a neck portion with the neck portion having attached thereto latch retention means. The lid has an inner diameter which is greater than the outer diameter of the neck portion such that the neck portion and lid are telescopically inter-connected. The handle is secured to the lid by handle retention means.

15 Claims, 4 Drawing Sheets

BEVERAGE CONTAINER COOLER

BACKGROUND OF THE INVENTION

The present invention relates generally to cooling devices, and more particularly, to coolers for keeping beverages in typical containers cool for a lengthy period of time.

Many individuals enjoy consuming soft drinks during the day while at work. Typically the soft drinks are consumed from cans purchased at a vending machine located in or near the individual's place of work. In addition to being a relatively expensive habit, the purchase of 12 or 16 oz. cans necessitates that the beverage be consumed as soon as possible for two reasons. First, the beverage in the can tends to warm up over time, such that it becomes unpalatable. Secondly, over time the carbonation level of the beverage decreases, such that the beverage eventually tastes "flat".

In attempting to address the problem of canned, cold beverages becoming warm to the taste, foam sleeves for receiving beverage cans have been developed, with these sleeves providing insulation between the drinker's fingers and the outer surface of the can which therefore slows down the warming process slightly. Examples of these sleeves are: Rimmer, U.S. Pat. No. 4,798,063 and Kelly, U.S. Pat. No. 4,344,303.

Beverage container coolers for canned beverage containers are also known which utilize ice in an attempt to keep the beverage in the container cool. An example of this type of container is Simila, U.S. Pat. No. 4,638,645. However, this type of device suffers from problems associated with the water produced by the melting ice, in addition to uneven cooling of the beverage container, since as mentioned above, the ice over time will melt thereby decreasing the cooling layer adjacent the can.

Unfortunately, none of the known beverage container coolers are designed for use with a plastic bottle, especially one of the two liter size. Two liter plastic bottles have several advantages over cans. First, they are resealable, so the amount of beverage consumed at a given time may vary without loss of coolness or effervescence. Secondly, the purchase price of a two liter bottle of soft drink results in a saving to the consumer when compared with the cost per ounce of soft drinks in cans.

However, there are problems associated with the bringing a two liter soft drink bottle into the work place. First, there is the problem with keeping the container cool. This problem can often be remedied by placing the bottle in a refrigerator, if one is available. However, even if a refrigerator is available, if several people attempt to refrigerate their own two liter bottles, storage becomes a problem as well as the potential for confusion as to whose bottle is which. Furthermore, there is always the possibility under the above scenario that someone will accidentally or intentionally consume a beverage which is not theirs. Still further, there is the potential for tampering with the beverage if the seal has previously been broken through the opening of the bottle.

Another problem associated with bringing plastic bottles into the work place, is that in the event a refrigerator is not available, the bottle must then be stored near the individual's work place. Options such as the use of an ice chest or the transfer of the beverage into a thermos bottle are messy, time-consuming, and involve clean up. The keeping of an unrefrigerated two liter bottle at a work station is unsightly and may attract insects.

It is thus apparent that the need exists for an improved beverage container cooler for plastic bottles or the like which provides the cooling of the bottle as well as an attractive storage unit.

SUMMARY OF THE INVENTION

The problems associated with prior beverage container coolers are overcome in accordance with the present invention by providing a beverage container cooler specifically fabricated for use in conjunction with resealable, plastic, two-liter bottles. The beverage container cooler of this invention includes a roughly cylindrical container having an open end, an insert capable of encircling a beverage container, which insert is filled with a cooling fluid which is preferably gelatinous. The cooling fluid assists in maintaining the temperature inside the roughly cylindrical container when the insert is placed thereinto. The beverage container cooler also includes a lid securable to the roughly cylindrical container with the lid having a handle.

The insert comprises a flexible plastic cylinder having a plurality of pouches with the pouches containing the cooling fluid. The handle is secured to the lid by handle retention means which encircle the lid. Finally, the handle has formed therein a slotted portion which includes locking means which cooperates with latch retention means secured about the neck portion of the roughly cylindrical container. Preferably the roughly cylindrical container and the lid are fabricated from an insulative material such as styrofoam while the handle and insert are formed preferably from plastic.

It is the primary object of the present invention to provide a beverage container cooler which effectively cools a plastic beverage bottle, so as to permit the dispensing of selective quantities of chilled beverage therefrom.

Another object of the present invention is to provide a beverage container cooler for use with resealable plastic beverage bottles, which cooler is attractive, light in weight, and durable.

Still another object of the present invention is to provide a beverage container cooler which is conveniently and inexpensively formed and which is easy to use.

Other objects and advantages of the invention will be apparent from the following description, the accompanying drawings, and the appended claims.

DETAILED DESCRIPTION OF THE INVENTION

Figure 1:
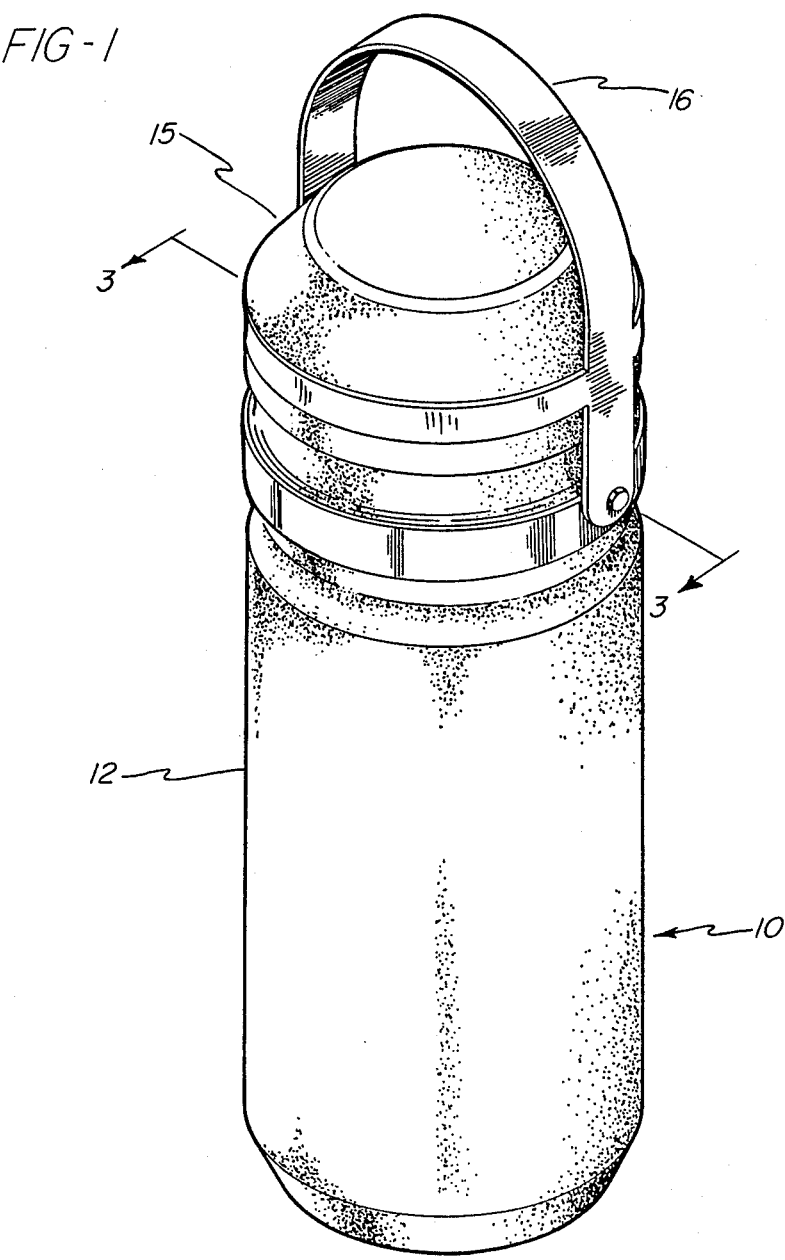
FIG. 1 is a prospective view of a beverage container cooler in accordance with the present invention.

Having reference to the drawings, attention is directed first to FIG. 1 which illustrates a beverage container cooler embodying this invention designated generally by the numeral 10. This beverage container cooler as can better be seen in FIG. 2, comprises a roughly cylindrical container 12 having an open upper end 13. The beverage container cooler 10 also comprises an insert 14 and lid 15, the lid 15 being equipped with a handle 16.

The roughly cylindrical container 12 features a closed bottom 17 and sidewall 18 having an inner wall surface 19 and an outer wall surface 20. The cylindrical container 12 is divided into a lower portion 21 and a neck portion 22 having a top edge 23.

A latch retention means 24 preferably encircles the cylindrical container 12 in the approximate area of the neck portion 22. The latch retention means has posts 25 projecting therefrom on opposite sides of the container. Posts 25 may be fabricated of metal or plastic, such as preferably is the latch retention means, with each of posts 25 having a center cylindrical portion and a flat head. The advantage each of having post 25 fabricated from a plastic, is that there may be some slight tendency for flexibility, however, the plastic should be resilient enough so as not to be easily permanently deformed.

Insert 14 preferably is fabricated from a plastic, and while it is desirable that the insert be flexible, it is not an absolute necessity. Insert 14 has fabricated therein a plurality of pouches 30 which contain a cooling fluid 31. Cooling fluid 31 is preferably a gelatinous substance, which is refreezable. The outer diameter of the insert is slightly smaller than the inner diameter of the cylindrical container 12. Possible dimensions are as follows, the height of the cylindrical container 12 is approximately 27 cm, the outside diameter is 41 cm and the inside diameter is 38 cm. The height of the insert is approximately 25 cm, the outside diameter when almost frozen is 36.5 cm and the inside diameter of the insert is 35 cm. The height of the cap is 8 cm with the outside diameter being close to that of the outside diameter of the cylindrical container 12. The handle extends approximately 12 cm above the apex of the cap.

Preferably the insert 14 has a smooth insert inner wall 34 and a rounded insert outer wall 35 to accommodate an insulative layer of air between the insert and the cylindrical container. In the preferred embodiment the relatively flat insert 14 is secured to itself by fastening means 36 located near the opposite ends of the insert, such that when unfastened for purposes of refreezing the insert may conveniently lay flat in the freezer. Fastening means 36 could include cooperative fastening means such as Velcro ® strips.

Figure 2:
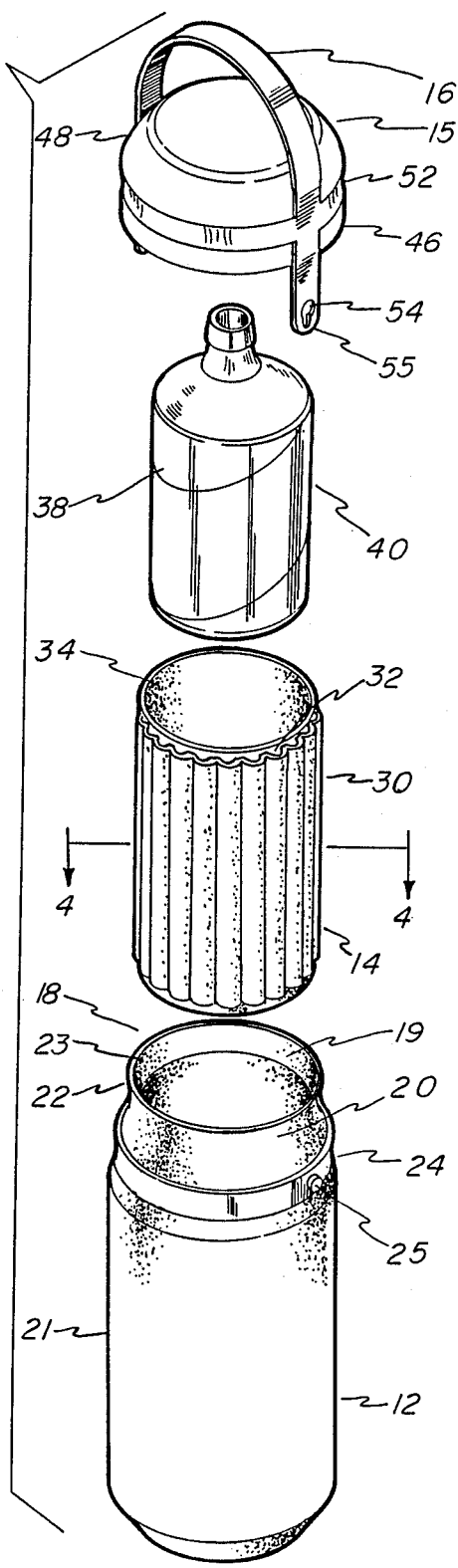
FIG. 2 is an exploded view showing the components of the container cooler as well as a beverage bottle capable of being used in conjunction with the invention.
Figure 3:
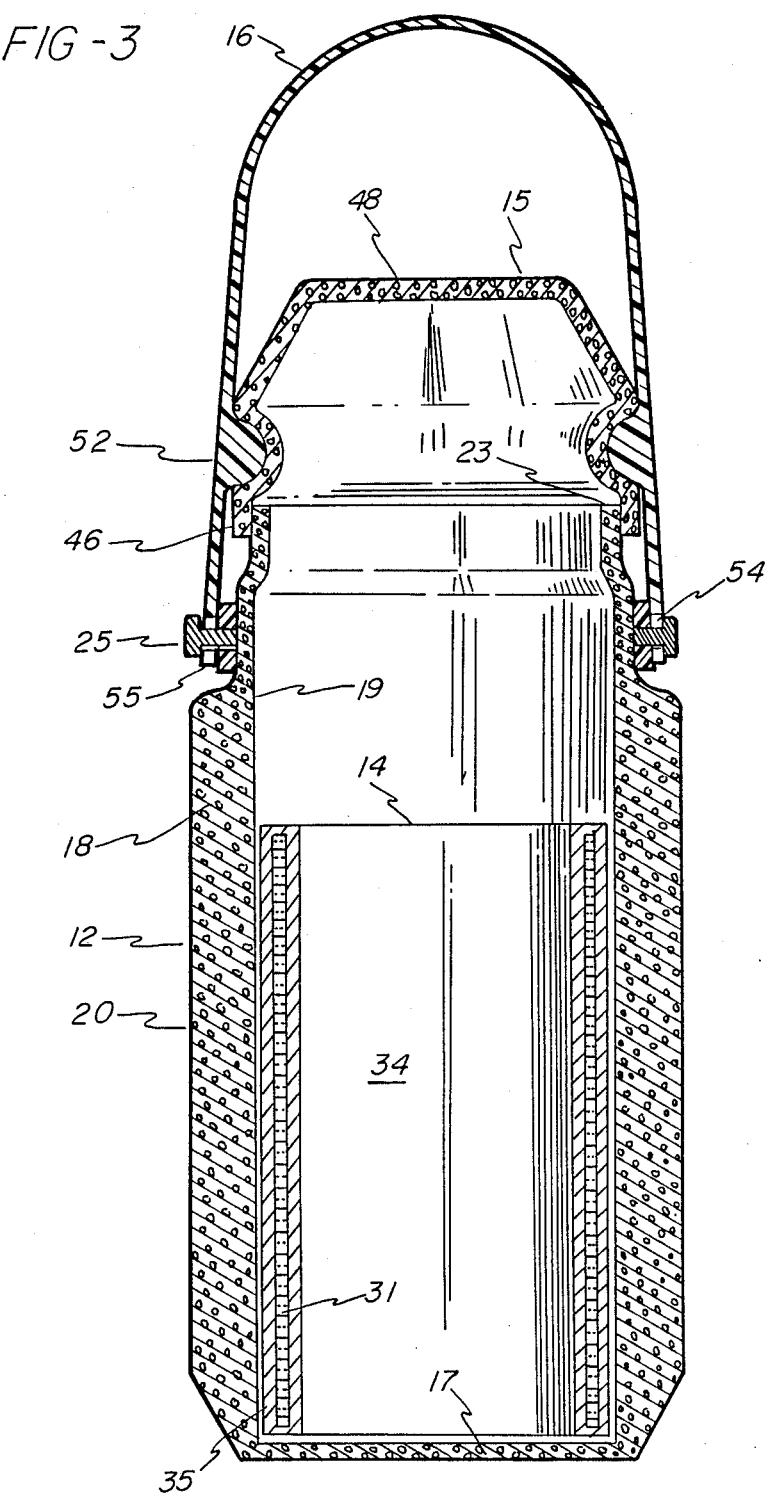
FIG. 3 is a vertical sectional view taken along line 3—3 of FIG. 1.
Figure 4:
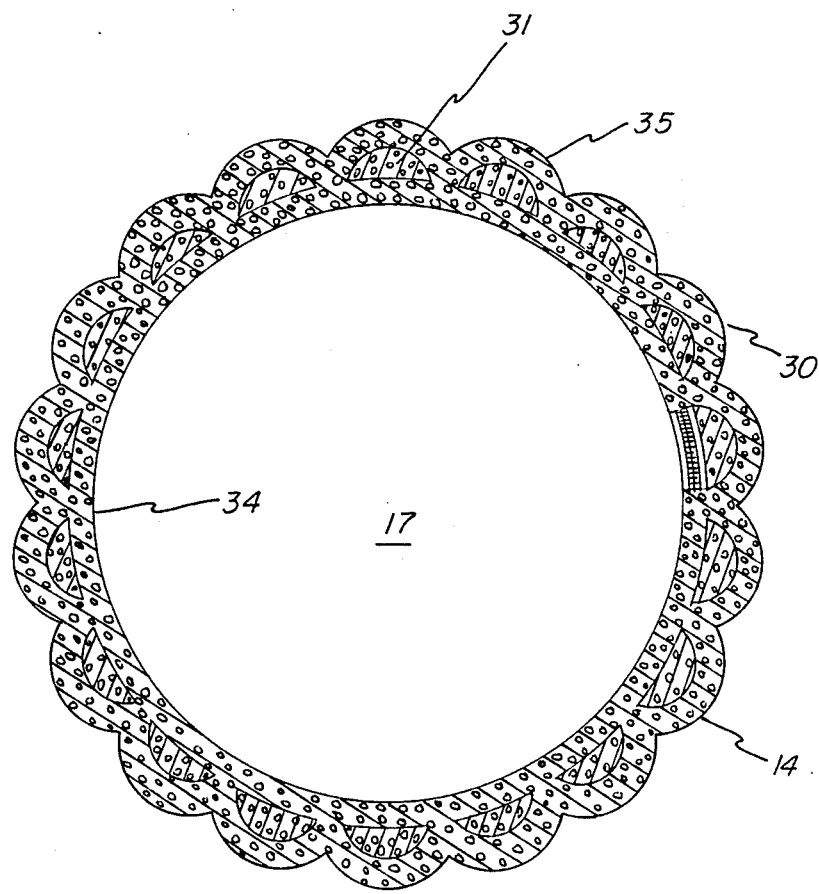
FIG. 4 is a horizontal sectional view taken along line 4—4 of FIG. 2.

As can be seen FIG. 2, bottle 40 is placed inside inner insert wall 34 such that the exterior wall 38 of container 40 is directly adjacent inner insert wall 34.

Lid 15 is formed having a bottom open portion 46 and a top domed portion 48. The neck portion of the cylindrical container 12 has an outer diameter while the lid has an inner diameter less than the outer diameter of the neck portion, such that the neck portion and lid are telescopically inter connected. Secured to lid 15 is handle retention means 52, which encircles the lid near the bottom portion 46. The handle 16 has formed therein near its lower most point a slotted portion 54 having a still narrower portion 55 which serves as locking means. Locking means 55 cooperates with the cylindrical portion of latch 25 to provide for the secure attachment of the lid to the cylindrical container 12 thereby creating an aesthetically pleasing container cooler while at the same time facilitating the easy carrying of the beverage container in beverage container cooler 10. This invention, in addition to its benefits in the workplace, is ideally suited for use at sporting events, outings, picnics and other similar activities.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A beverage container cooler, comprising
    a roughly cylindrical container having an open end, said roughly cylindrical container comprising a bottom and a side wall, said side wall comprising a lower portion and a neck portion, said neck portion having attached thereto latch retention means,
    an insert capable of encircling a beverage container, said insert comprising a plurality of pouches, said pouches containing a cooling fluid that when cooled assists in maintaining the temperature inside said roughly cylindrical container when said insert is placed thereinto, and
    a lid, said lid being securable to said roughly cylindrical container.

2. The beverage container cooler as claimed in claim 1 wherein said cooling fluid is a gelatinous substance.

3. The beverage container cooler as claimed in claim 1 wherein said insert is relatively flat with fastening means located near the opposite ends of said insert, said fastening means cooperatively securable.

4. A beverage container cooler comprising
    a roughly cylindrical container having an open end, said roughly cylindrical container comprising a bottom and a side wall, said side wall comprising a lower portion and a neck portion, said neck portion having an outer diameter,
    an insert capable of encircling a beverage container, said insert comprising a plurality of pouches, said pouches containing a cooling fluid that when cooled assists in maintaining the temperature inside said roughly cylindrical container when said insert is placed thereinto, and
    a lid, said lid being securable to said roughly cylindrical container, said lid having an inner diameter, said outer diameter of said neck portion being less than the inner diameter of said lid, such that said neck portion and said lid are telescopically interconnected.

5. The beverage container cooler as claimed in claim 4 wherein said lid has secured thereto a handle.

6. The beverage container cooler as claimed in claim 4 wherein said handle is secured to said lid by handle retention means.

7. The beverage container cooler as claimed in claim 6 wherein said handle has formed therein a slotted portion, said slotted portion comprising locking means.

8. The beverage container cooler as claimed in claim 4 wherein said insert is relatively flat with fastening means located near the opposite ends of said insert, said fastening means cooperatively securable.

9. A beverage container cooler comprising in combination
    a beverage container,
    a roughly cylindrical container having an open end, said roughly cylindrical container comprising a bottom and a side wall, said side wall comprising a lower portion and a neck portion, said neck portion having attached thereto latch retention means, an insert encircling said beverage container, said insert being filled with a gelatinous substance that when cooled assists in maintaining the temperature inside said roughly cylindrical container when said insert is placed thereinto, said insert comprising a plurality of pouches, said pouches containing said gelatinous substance, and a lid, said lid being securable to said roughly cylindrical container.

10. The beverage container cooler as claimed in claim 9 wherein said insert has fastening means located near the opposite ends of said insert, said fastening means cooperatively securable.

11. A beverage container cooler as claimed in claim 11 comprising in combination a beverage container, a roughly cylindrical container having an open end, said roughly cylindrical container comprising a bottom and a side wall, said side wall comprising a lower portion and a neck portion, said neck portion having an outer diameter, an insert encircling said beverage container, said insert comprising a plurality of pouches, said pouches being filled with a gelatinous substance that when cooled assists in maintaining the temperature inside said roughly cylindrical container when said insert is placed thereinto, and a lid, said lid being securable to said roughly cylindrical container, said lid having an inner diameter, said outer diameter of said neck portion being less than the inner diameter of said lid, such that said neck portion and said lid are telescopically interconnected.

12. The beverage container cooler as claimed in claim 11 wherein said lid has secured thereto a handle.

13. The beverage container cooler as claimed in claim 12 wherein said handle is secured to said lid by handle retention means.

14. The beverage container cooler as claimed in claim 13 wherein said handle has formed therein a slotted portion, said slotted portion comprising locking means.

15. The beverage container cooler as claimed in claim 11 wherein said insert has fastening means located near the opposite ends of said insert, said fastening means cooperatively securable.

* * * * *